US006775258B1

(12) United States Patent
van Valkenburg et al.

(10) Patent No.: US 6,775,258 B1
(45) Date of Patent: Aug. 10, 2004

(54) APPARATUS, AND ASSOCIATED METHOD, FOR ROUTING PACKET DATA IN AN AD HOC, WIRELESS COMMUNICATION SYSTEM

(75) Inventors: Sander van Valkenburg, Helsinki (FI); Marc Solsona Palomar, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/527,786

(22) Filed: Mar. 17, 2000

(51) Int. Cl.[7] .................................................. H04Q 7/24
(52) U.S. Cl. .................... 370/338; 370/349; 455/507
(58) Field of Search .......................... 370/320, 335, 370/338, 342, 349, 389–390, 392–393, 400–404, 475; 455/507, 517, 524, 525, 95

(56) References Cited

U.S. PATENT DOCUMENTS

| 5,371,734 | A | | 12/1994 | Fischer | 370/18 |
|---|---|---|---|---|---|
| 5,412,654 | A | * | 5/1995 | Perkins | 370/312 |
| 5,572,528 | A | | 11/1996 | Shuen | 370/85 |
| 5,875,186 | A | | 2/1999 | Belanger et al. | 370/331 |
| 5,926,468 | A | * | 7/1999 | Chapman et al. | 370/328 |
| 5,964,841 | A | | 10/1999 | Rekhter | 709/242 |
| 5,987,011 | A | * | 11/1999 | Toh | 370/331 |
| 5,996,021 | A | | 11/1999 | Civanlar et al. | 709/238 |
| 6,304,556 | B1 | * | 10/2001 | Haas | 370/254 |
| 6,307,843 | B1 | * | 10/2001 | Okanoue | 370/312 |
| 6,535,498 | B1 | * | 3/2003 | Larsson et al. | 370/338 |
| 6,557,044 | B1 | * | 4/2003 | Cain et al. | 709/242 |
| 6,587,457 | B1 | * | 7/2003 | Mikkonen | 370/356 |

FOREIGN PATENT DOCUMENTS

| EP | 0 768 777 A2 | 4/1997 |
|---|---|---|
| WO | WO 99/05829 | 2/1999 |

OTHER PUBLICATIONS

D. Groten and J.R. Schmidt; "Bluetooth–based Mobile Ad Hoc Networks: Opportunities and Challenges for a Telecommunications Operator"; Vehicular Technology Conference on May 6–9, 2001; IEEE VTS 53rd, vol. 2, pp. 1134–1138.*

Y. Liu, M.J. Lee and T.N. Saadawi; "A Bluetooth scatternet–route structure for multihop ad hoc networks"; IEEE Journal on Selected Areas in Communications; vol. 21, Issue: 2, Feb. 2003; pp. 229–239.*

(List continued on next page.)

*Primary Examiner*—Chi Pham
*Assistant Examiner*—Thai Hoang

(57) ABSTRACT

Apparatus, and an associated method, by which to route packets of data between a data source node and a data destination node in an ad hoc, wireless network, such as a Bluetooth scatternet. Data routing tables are provided to each node, and header information extracted from a packet header is used by such tables. Routing of a packet of data is effectuated in a hop-by-hop manner to effectuate the communication of the packet from the data source node to the data destination node.

17 Claims, 7 Drawing Sheets

OTHER PUBLICATIONS

M. Albrecht, M. Frank, P. Martini; M. Schetelig, A. Vilavaara and A. Wenzel; "IP Services over Bluetooth: Leading the Way to a New Mobility"; Conference on Oct. 18–20, 1999; Local Computer Networks, 1999; pp. 2–11.*

P. Bhagwat and A. Segall;"A Routing Vector Method (RVM) for Routing in Bluetooth Scatternets"; Mobile Multimedia Communications, 1999. (MoMuC '99) 1999 IEEE International Workshop on Nov. 15–17, 1999; pp. 375–379.*

Broch, Josh, et al.; "A Performance Comparison of Multi–Hop Wireless Ad Hoc Network Routing Protocols"; XP–002199757; Proceedings of the Fourth Annual ACM/IEEE International Conference Mobile Computing and Networking (MobiCom '98), Oct. 25–20, 1998, Dallas, Texas, USA.; pp. 1–13.

Broch, Josh, et al.; "The Dynamic Source Routing Protocol for Mobile Ad Hoc Networks"; XP–002199758; IETF Manet Working Group—Internet Draft; Mar. 13, 1998; pp. 1–38.

Perkins, Charles E., et al.; "Highly Dynamic Destination–Sequenced Distance–Vector Routing (DSDV) for Mobile Computers"; 8282 Computer Communication Review Oct. 24, (1994), No. 4, New York, U.S.; pp. 234–244.

* cited by examiner

32

| Local ID | Bluetooth Device Address |
|---|---|
| AM_ADDR (3 bit) | BD_ADDR (48 bit) |
| | |

FIG. 6

| Protocol | Local ID | Sequence Number (PicoIP) 112 | Source port number 114 | Destination port number 116 | Source port number 118 (IP) | Destination port number 122 |
|---|---|---|---|---|---|---|
| 106 | 108 | | | | | |

APPARATUS, AND ASSOCIATED METHOD, FOR ROUTING PACKET DATA IN AN AD HOC, WIRELESS COMMUNICATION SYSTEM

The present invention relates generally to a manner by which to communicate packet data in an ad hoc, wireless communication system, such as a Bluetooth scatternet. More particularly, the present invention relates to apparatus, and an associated method, by which to facilitate routing of packet-formatted data pursuant to a communication session in the Bluetooth scatternet, or other ad hoc, wireless communication system. A new packet header is provided to facilitate routing of the packet-formatted data so-formed. And, new tables are provided for each node in a communication path utilized during a communication session to facilitate the routing of the packet data pursuant to a hop-by-hop communication scheme.

BACKGROUND OF THE INVENTION

Technological advancements in communication technologies have permitted the introduction, and popularization of usage, of new types of communication systems. Communication devices of both increased processing capacities and of smaller sizes are able to be utilized in applications and in situations not previously possible or practical.

New wireless communication systems, and communication devices operable therein, have been made possible as a result of such advancements. A cellular communication system capable of communicating packet data is exemplary of a new wireless communication system made possible as a result of technological advancements. A Cellular communication system includes a network infrastructure which is installed in a geographical area and affixed in position. Mobile terminals operable in a cellular communication system communicate by way of the network infrastructure.

Additional types of communication systems have been proposed which also take advantage of the advancements in communication technologies. For instance, ad hoc, i.e., infrastructure-free, communication systems have been proposed. The Bluetooth standard sets forth an ad hoc, communication system which provides for wireless connectivity of a large number of different devices. Bluetooth devices are connectable in an ad hoc manner by way of short-distance radio links, thereby to permit data to be communicated between such Bluetooth devices. Each Bluetooth device forms a node in the Bluetooth system, sometimes referred to as a Bluetooth scatternet. But, because a Bluetooth system, unlike a cellular communication system, does not have a fixed infrastructure, effectuating communications therethrough is made more difficult.

The Bluetooth devices are potentially mobile, and movement of the Bluetooth devices necessitates corresponding link changes as a result of such movement. The Bluetooth standard defines piconets formed of a master and slave relationship between one Bluetooth device forming a master and up to seven Bluetooth devices forming slaves to the master. A master of one piconet might also be a slave in another piconet, and the piconets together define a scatternet. Communications are effectuable between Bluetooth devices positioned within different piconets. Random access by a Bluetooth device to communicate in the Bluetooth scatternet is not permitted as the master Bluetooth device of each piconet controls the access to the system. Instead, to form a connection by which to effectuate a communication session, the Bluetooth devices must register with each other in order to set up a connection in which of the devices, i.e., the master, controls the connection.

Existing routing protocols by which to communicate packet data do not adequately take into account the unique aspects of an ad hoc network. Routing protocols developed for fixed networks are not suitable as such protocols are not able to adapt to link changes which occur in a Bluetooth scatternet, or other ad hoc, network. And, while other routing protocols have been developed for general ad hoc networks, the unique features and limitations of a system implemented pursuant to the Bluetooth standard limit the usefulness of such existing routing protocols to effectuate communications in a Bluetooth scatternet. A routing protocol for a Bluetooth scatternet must exhibit an appropriate trade-off between relieving nodes in a communication path formed pursuant to a communication session of processing, routing, and other overhead, information while also keeping track of the routes forming communication paths even in lieu in changing network topologies.

If a manner could be provided by which better to route packet data in an ad hoc, wireless network, such as a Bluetooth scatternet, improved communications therein would be possible.

It is in light of this background information related to ad hoc, wireless networks that the significant improvements of the present invention have evolved.

SUMMARY OF THE INVENTION

The present invention, accordingly, advantageously provides apparatus, and an associated method, by which to facilitate routing of packet-formatted data and in an ad hoc, wireless communication system. Through operation of an embodiment of the present invention, routing of packet data between any pair of nodes within a Bluetooth scatternet is made possible.

The routing protocol provided pursuant to an embodiment of the present invention is compatible with existing IPv4 and IPv6 protocols. Additionally, higher-layer protocols, such as TCP (Transport Control Protocol) or UDP, are overlayable upon the routing protocol, thereby to be transparent to users.

In one aspect of the present invention, a new packet header structure is provided. The packet header structure is shorter, relative to conventional IP headers. In one implementation, the packet header structure, herein referred to as a PicoIPv4 packet structure, replaces existing IPv4 packet headers. In another implementation, a new packet header structure, referred to herein by PicoIPv6, replaces conventional IPv6 packet headers. The type of header structure utilized, for instance, is dependent upon the version of IP expected by a higher layer of protocol, such as the TCP or UDP layer.

In another aspect of the present invention, new tables are defined for each Bluetooth device which forms a node in a communication path, inclusive of a Bluetooth data source node and a Bluetooth data destination node. Each Bluetooth, or other ad hoc, device is capable of forming a master device or a slave device, and each of the Bluetooth devices includes a mapping table for mapping incoming packets to outgoing packets received at, and forwarded on, by a communication node. Also, each of the devices includes an IP routing table for mapping IP addresses to a subsequent hop address defining a subsequent node in the communication path. And, each of the Bluetooth devices also includes a table that maps a currently-allocated local identifier and the device's associated master's identifier. Information utilized to fill the tables is obtained from packet header information contained in the packet header structure of packet data applied to each node in the communication path. By storing the information in the tables provided to each of the nodes, routing information thereby becomes stored at the tables of the nodes in the communication path.

In another aspect of the present invention, datagram communication is provided to communicate packet data between a data source node and a data destination node within a piconet, within the Bluetooth scatternet, or between a node of the scatternet and a node of a fixed network, e.g., the Internet, to which a Bluetooth device is coupled. Hop-by-hop routing of the packet data is utilized in which every node involved in the communication path from the data source node to the data destination node determines, based upon information stored at the tables of the respective nodes, to which next hop, i.e., node, the packet data is to be transported. Hop-by-hop routing is permitted as the routing information about all ongoing connections in a communication path in the scatternet are contained in routing tables maintained by each node involved in the communication session or connection. Each packet is sent from hop to hop, i.e., from node to subsequent node, and must therefore contain an identifier for the subsequent hop and also the final destination, i.e., the data destination node. For the destination node, the IP address thereof suffices, for the data source node, the local identifier thereof is utilized. Each packet is further identified to indicate the connection, that is, communication session. A sequence number is utilized to identify packets. Each node that communicates a packet to a subsequent hop, i.e., node, identifies a packet belonging to a certain connection with a certain destination with a unique sequence number. The sequence number is assigned when setting up the connection.

Due to the inherent mobility of at least some Bluetooth devices, their movement affects the routing tables contained at each of the devices. When a Bluetooth device moves, the location thereof within the Bluetooth scatternet changes, or, the Bluetooth device moves out of communication range of the scatternet. The tables provided to the Bluetooth devices pursuant to an embodiment of the present invention contain information in such tables to facilitate appropriate route setup, and rerouting, to take into account the movement of such Bluetooth devices.

In these and other aspects, therefore, apparatus, and an associated method, is provided for facilitating routing of packets of data between a data source node and a data destination node by way of a communication path formed in a multinode, ad hoc, wireless communication system. The communication path has at least one node, inclusive of the data destination node. The apparatus comprises at least one first routing table having an incoming data ledger and an outgoing data ledger in which the first routing table maps an incoming data packet into an outgoing data packet.

A more complete appreciation of the present invention and the scope thereof can be obtained from the accompanying drawings which are briefly summarized below, the following detailed description of the presently-preferred embodiments of the present invention, and the appended claims.

BRIEF DESCRIPTION OF THE DRAWING

FIG. 6 illustrates a representation of an address mapping table also provided to each Bluetooth device of the Bluetooth scatternets shown in FIGS. 1 and 2 pursuant to an embodiment of the present invention.

FIG. 9 illustrates a representation of an agent routing table, also utilized pursuant to an embodiment of the present invention.

DETAILED DESCRIPTION OF THE PREFERRED EMBODIMENT

Figure 1:
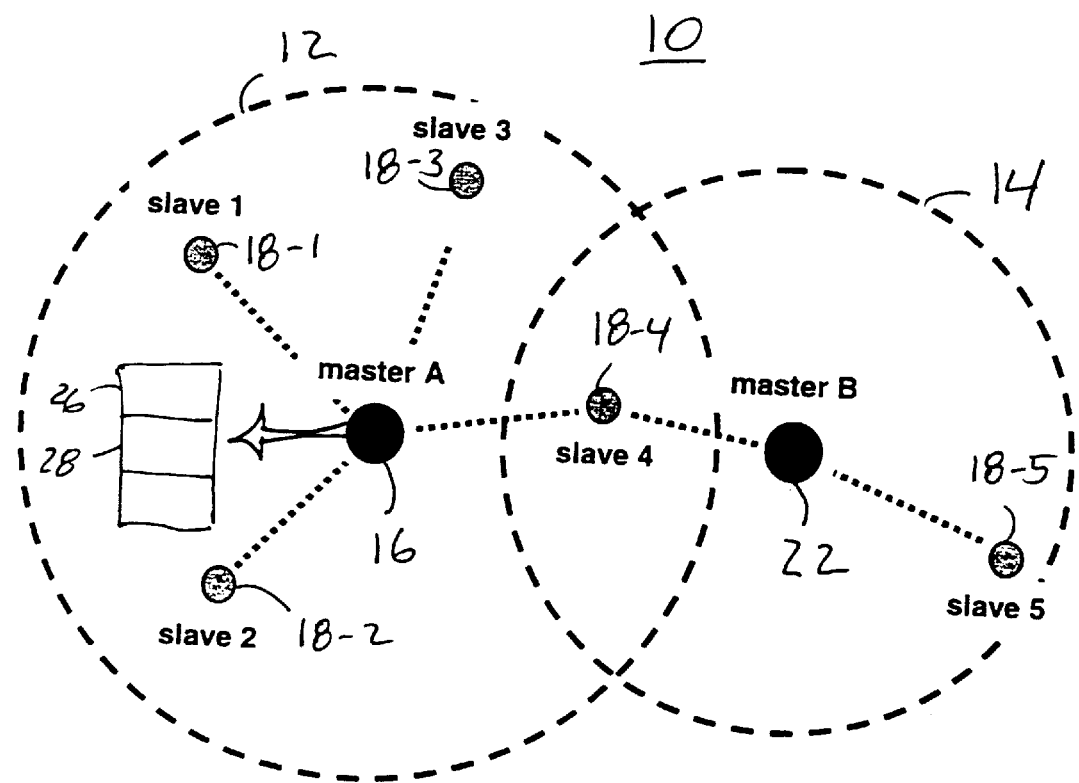
FIG. 1 illustrates a functional representation of an exemplary Bluetooth scatternet, exemplary of an ad hoc, wireless network in which an embodiment of he present invention is operable.

Referring first to FIG. 1, a representative portion of an exemplary Bluetooth scatternet, shown generally at 10, provides for packet communications between Bluetooth devices operable therein. While the following description of the present invention shall be described with respect to a Bluetooth system, such a system is representative of an ad hoc, wireless communication network. In other implementations, various embodiments of the present invention are operable therein. And, operation of various embodiments of the present invention can similarly be described with respect to such other ad hoc, wireless communication networks.

The Bluetooth scatternet 10 shown in FIG. 1 includes two piconets, a first piconet 12 and a second piconet 14. Each piconet of the scatternet is defined by a master Bluetooth device and up to seven slave Bluetooth devices. Here, the first piconet 12 is defined by a master Bluetooth device 16 and four slave Bluetooth devices 18, here referenced by 18-1, 18-2, 18-3, and 18-4. And, the second piconet 14 is defined by a master Bluetooth device 22 and two slave devices 18, here referenced by 18-4 and 18-5.

Figure 2:
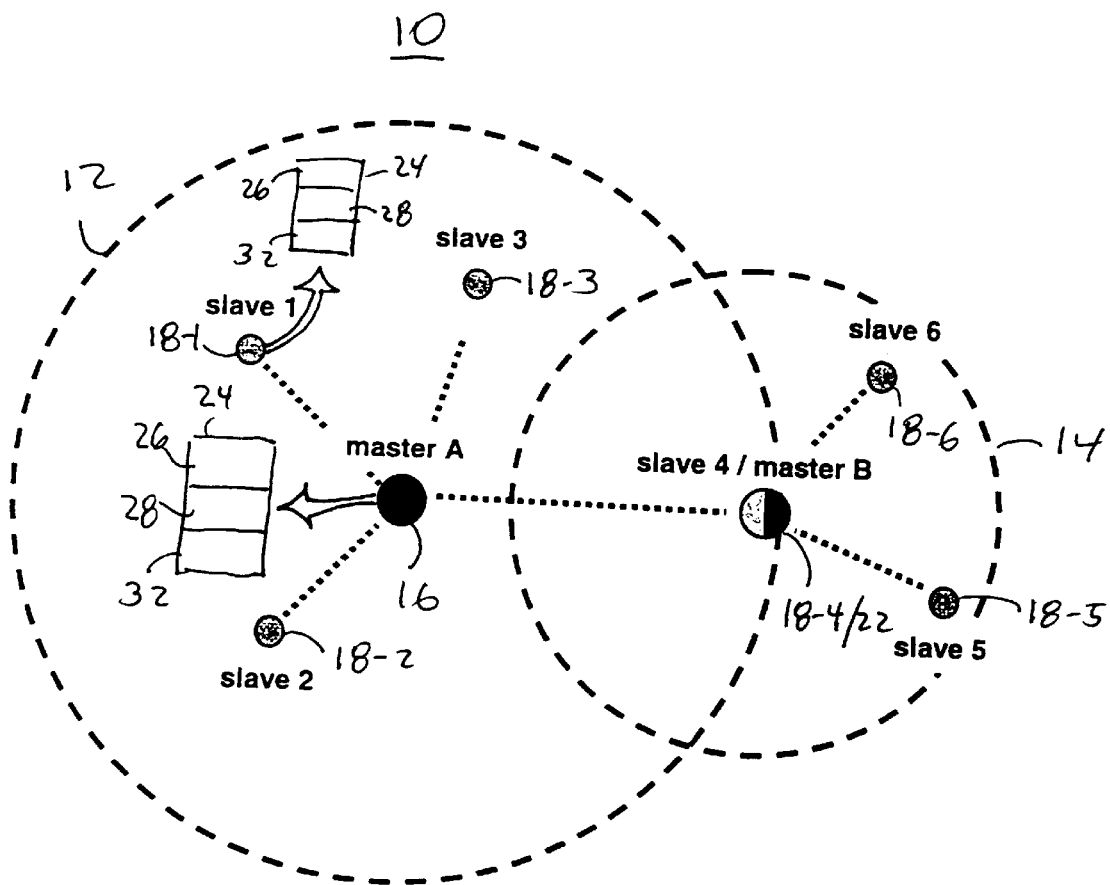
FIG. 2 illustrates a functional representation, similar to that shown in FIG. 1, of a Bluetooth scatternet, also exemplary of an ad hoc network in which an embodiment of the present invention is operable.

FIG. 2 also illustrates a representative portion of the Bluetooth scatternet 10. Again, the portion illustrated includes the first piconet 12 and the second piconet 14 wherein the first piconet is defined by a master device 16 and four slave devices 18-1, 18-2, 18-3, and 18-4. Here, though, the second piconet 14 is defined by a master device which is a slave device to the master device 16 of the first piconet. The device forming both a slave and a master is referenced by 18-4/22.

The devices which form the Bluetooth scatternet are mobile and form, on an ad hoc basis, the network of the Bluetooth scatternet. Through movement of the devices which form the scatternet, the various piconets of the scatternet are redefinable, as appropriate, and the Bluetooth devices of the scatternet are variously slave devices and master devices, sometimes, and as indicated by the device 18-4/22, shown in FIG. 2, form both a slave and a master device in separate piconets. Because of the ad hoc nature of the Bluetooth scatternet, routing of packet data between a sending station and a receiving station, of which any of the Bluetooth devices of the scatternet can be formed, conventional routing of packet-formatted data are not readily adaptable for use in an ad hoc network. The routing protocol, and associated data structures utilized pursuant to an embodiment of the present invention overcome the limitations of the existing art by which packet data is conventionally communicated. More particularly, in an embodiment of the present invention, each of the Bluetooth devices of the scatternet 10 are provided with additional data structures which store data utilized to route a packet of data from device-to-device between a sending device and a receiving device. The Bluetooth devices shall herein also be referred to as nodes in which a sending device forms a data source node and a receiving device forms a data destination node. One or more other devices might be positioned between the data source and data destination nodes and such devices shall herein, at times, be referred to as intermediary nodes.

Pursuant to an embodiment of the present invention, each Bluetooth device includes a storage element 24 at which tables 26, 28, and 32 are defined. FIG. 2 illustrates the storage element 24 and the tables 26–32 of the master device 16 and the slave device 18-1. Each of the other devices of the scatternet also include the storage element 24 and have the tables 26–32 defined therein.

Figure 3:
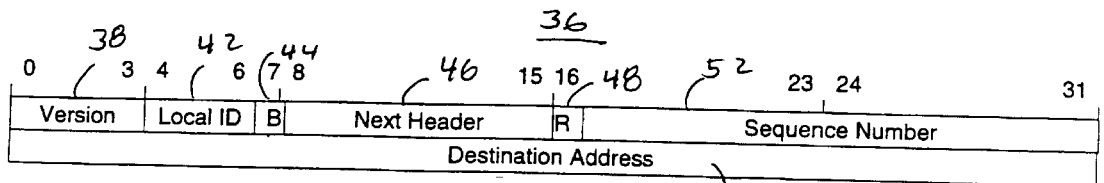
FIG. 3 illustrates a representation of the format of a packet header structure provided pursuant to an embodiment of the present invention of a packet of data.

Also pursuant to an embodiment of the present invention, a new packet header structure is defined. The packet header structure is formatted to form the header portion of each packet of data communicated between a data source node and a data destination node. FIG. 3 illustrates the format of the header structure of an exemplary header, shown at 36, provided pursuant to an embodiment of the present invention. The header 36 shall also herein, at times, be referred to as a piconet header. The header 36 is used in substitution of a conventional, IP header of conventional, IP-formatted data.

The packet header 36 is here shown to include six fields, here fields 38, 42, 44, 46, 48, and 52, and an address 54. The fields 38–52 together are of four octets (thirty-two bits), and the address 54 is selectably of thirty-two bits or one hundred twenty-eight bits, depending upon whether a transport layer/user assumes IPv4 or IPv6 operation.

The field 38 is a version field which provides coexistence with an IPv4 or IPv6 stack. Different ones of the nodes of the scatternet may have different interfaces, and the IPv4 and IPv6 may be the default networking protocols thereat. The header 36 can be based upon IPv4 and IPv6 and such alternate derivatives of IPv4 and IPv6 are indicated by different versions at the version field 38.

The field 42 forms a local ID field, here a three-bit AM_ADDR address currently assigned to the sending node, either the data source node or an intermediary, i.e., forwarding, node in a piconet. If the sender is the master device of the piconet, in the exemplary implementation, the zero-identifier is utilized, '000'.

The field 44 forms a single-bit broadcast flag. If the broadcast flag is set, the packet to which the header is associated forms a broadcast packet to be broadcast by every forwarding master.

The field 46 forms a next-header field which corresponds to the next-header field specified in IPv6. When the header 36 replaces an IPv4 header, instead, the next-header field 46 takes on the functionality of the protocol field of IPv4.

The field 48 forms a single-bit reply flag. When a packet of data is communicated from a data source node to a data destination node, the flag is set to be of a zero value, and when the packet is communicated from a destination node back to the source node, e.g., a reply to the original packet, the reply flag is set to a one value. As shall be noted below, the value of the reply flag indicates to which side of the table 26 should be checked during operation of communication of a packet of data pursuant to an embodiment of the present invention.

The field forms a sequence number field. The sequence number field identifies each packet uniquely in a piconet, together with the local ID field 42.

The address 54 is of values to identify the IP destination address of a first packet between two end points. The length of the address field 54 is dependent upon which of the IPv4 or IPv6 protocols is assumed by the transport layer.

Comparison of the header 36 with a conventional IP header (not shown) indicates that a link field, conventionally contained in a conventional IP header, does not form a portion of the header 36. Information about the link field is taken from an underlying layer, e.g., a L2CAP layer.

Figure 4:
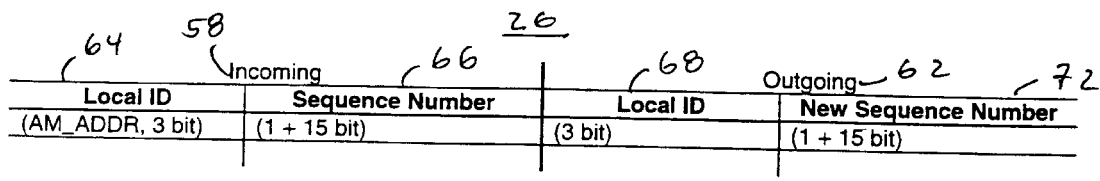
FIG. 4 illustrates a representation of a routing table positioned at each Bluetooth device of the scatternets shown in FIGS. 1 and 2 pursuant to an embodiment of the present invention.

FIG. 4 illustrates the table 26 which forms a portion of the storage element 24 of each of the Bluetooth devices of the Bluetooth scatternet 10 shown in FIG. 1 and 2. The table 26 forms a PicoIP routing table. The table 26 defines a mapping table operable to map incoming packets to outgoing packets. Notification that incoming and outgoing is defined for the uplink, wherein the direction of the uplink is defined by a value of the reply-bit field 48 of the header 36. If the value of the reply-bit is zero, the packet is reverted as going uplink, i.e., from a source node to a destination node. And, if the reply-bit is of a value of one, the packet is regarding as going downlink. The Figure illustrates the table 26 to include an incoming ledger 58 and an outgoing ledger 62. The incoming ledger 58 includes values of the local ID, here indicated at 64, and a sequence number, here indicated at 66. Values for the elements 64 and 66 are obtained from the fields 42 and 52 of the packet header 36. The outgoing ledger 62 is also shown to be formed of a local ID value, here indicated at 68, and a new sequence number, here indicated at 72.

Figure 5:
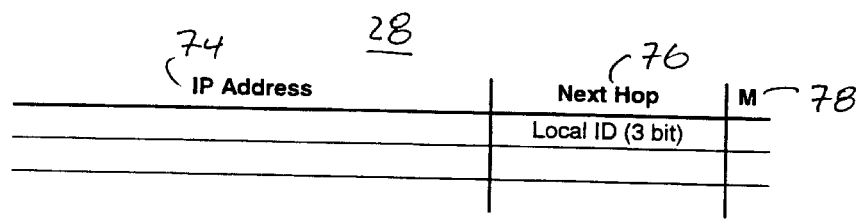
FIG. 5 illustrates a representation of another routing table, also provided to each Bluetooth device of the scatternets shown in FIGS. 1 and 2.

FIG. 5 illustrates the table 28 which also forms a portion of the storage element 24 of each of the Bluetooth devices forming the scatternet 10 shown in FIGS. 1 and 2. The table 28 here forms an IP routing table for mapping IP addresses to next-hop address of a subsequent node in a communication path formed between a data source node and data destination node. As shown in the Figure, the table 28 includes an IP address ledger 74 and a next-hop ledger 76. IP addresses are stored in the ledger 74 and next-hop addresses, identified by local IDs, are stored in the next-hop ledger 76. The table 28 also includes a master flag value (M) formed in the column ledger 78. The value of the master flag indicates the difference between an all-zero broadcast address and the local ID to indicate a master.

FIG. 6 illustrates the table 32 which forms a portion of the storage element 24 of each of the Bluetooth devices of the scatternet 10 shown in FIGS. 1 and 2. The table 32 maps a currently-allocated value of AM_ADDRs to the same devices' BD_ADDRs. When the Bluetooth device forms a slave device rather than a master device, the table 32 contains only the address of the master, the BD_ADDR value, or possibly, multiple masters' addresses. As all Bluetooth devices are operable as a master device or a slave device depending upon the function of the device in a piconet, the tables 26, 28, and 32 are common to each of the Bluetooth devices irrespective of the operation of the respective device as a master device or a slave device.

In operation, when a Bluetooth device is to initiate a communication session, the Bluetooth device generates and sends a PicoIP header 36 to which a PicoIP route setup packet is appended to form the body of the packet of data. The packet is sent to the destination, i.e., the data destination node. When the packet is received at the destination node, the destination node responds with a packet formed of a PicoIP header 36 without a body portion. The header of the reply packet contains values in the fields thereof corresponding to the header 36 initially generated by the data source node but with a different setting of the reply bit in the reply field 48. The sending of the route setup packet, and the return of the reply responsive thereto, causes the tables of all intermediary nodes to have data entered therein. Subsequent packets of data pursuant to the communication session shall contain the same header, followed by a transport layered data that is to be sent by the data source node. A time out is further associated with the route setup, and, when expired, a new route setup packet is sent out. The procedure is repeated for a selected number of times.

Figure 7:
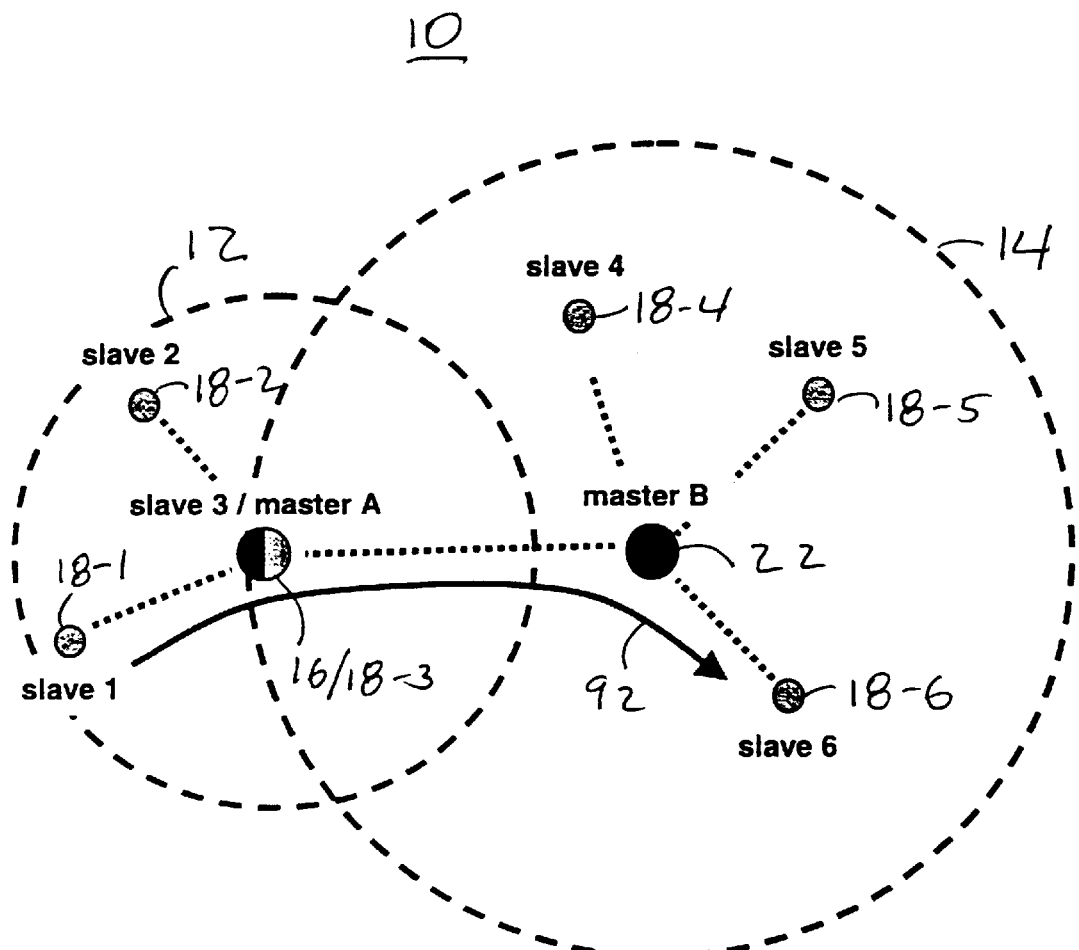
FIG. 7 illustrates a communication path formed in a Bluetooth scatternet and pursuant to which an embodiment of the present invention is operable.

FIG. 7 again illustrates another representative portion of a Bluetooth scatternet 10. Here, again, the illustrated portion of the scatternet includes a first piconet 12 and a second piconet 14. Here, the first piconet 12 is defined by a master device and two slaves. The slaves are designated by 18-1 and 18-2. The second piconet is defined by a master 22 and includes four slaves. One of the slaves of the master 22 in the piconet 14 is also the master of the piconet 12, and such Bluetooth devices designated by 16/18-3. The other slaves are designated by 18-4, 18-5, and 18-6. Operation of an embodiment of the present invention shall be described with respect to an implementation in which the slave device 18-1 initiates a communication session with the slave device 18-6. The communication path is represented by the arrow 92. A packet of data originated at the slave device 18-1 passes through two intermediary nodes, nodes 16/18-3 and node 22 prior to delivery to the data destination node, the slave 18-6. As noted above, to initiate the session, a PicoIP route setup packet is communicated by the device 18-1. The information contained in the packet, and the tables 26, 28, and 32 of the device 18-1 is as follows:

PicoIP routing table 26 {Local ID, Sequence Number, Local ID, Sequence Number$_{new}$}={0, 0; 1, SN$_{last}$+1}

IP routing table 28 is {IP address, next hop, M}={destination address, 0, 1}.

Packet header 36 {Local ID; broadcast flag, next header; reply flag}={1, 0, PicoIP Route Setup Packet (xx) 0}.

The Sequence Number is the sequence number used for the last route set up (indicated by SN$_{last}$), incremented by one. The IP address as contained in the packet header is the IP address of the data destination node 18-6. This address is retained in the header for each hop to the destination.

The packet is first provided to the device 16/18-3. Such device records the local ID and sequence number, contained in the packet header, and stores the extracted information into the PicoIP routing table 26 of the device 16/18-3. The device 16/18-3 then transmits two packets, a first of the packets is broadcast to all the slaves of the first piconet, in which '000' is the destination in the baseband packet. And, a second of the packets is forwarded to the node 22, the master of the second piconet. New sequence numbers are assigned to every packet in the same way as the manner in which a sequence number is assigned to the packet at the source node 18-1, that is to say, the last used sequence number is incremented by one.

The information contained in the packet header 36 and in the tables 26–32 of the device 16/18-3 is as follows:

Broadcast packet header {Local ID, broadcast flag, next header; reply flag, Sequence Number}={0, 0, xx, 0, SN$_{slave\ x}$}

Packet header for packet to master B {Local ID, broadcast flag, next header; reply flag, Sequence Number}={3, 0, xx, 0, SN$_{slave}$+1}.

PicoIP routing table {Local ID, Sequence Number, Local ID, Sequence Number$_{new}$}={1, SN$_{slave\ 1}$; 0, SN$_{last}$+1}; {1, SN$_{slave\ 1}$; 3, SN$_{last}$+2}.

IP routing table is {IP address, next hop, M}={destination address, 0, 0}; {dest. address, 0, 1}.

Each slave in the piconet 12 then receives the packet, and each slave discards the packet unless the slave is the destination node, or participating on another piconet. If the IP routing table thereof indicates that the sender of the packet is the next hop to the destination, the packet will be discarded. For instance, slave device 18-1 discards the packet on the basis that the node 16/18-3 is the next hop to the destination node 18-6. The node 22 also receives the packet. As the node 22 is participating only in the piconet 14, the node 22 broadcasts the received packet to all of its slaves, slaves 18-3, 18-4, 18-5, and 18-6.

The information contained in the packet header 36 in tables 26–32 of the node 22 is as follows:

Broadcast packet header {Local Id, broadcast flag, next header; reply flag, Sequence Number}={0, 0, xx, 0, SN$_{slave\ x}$}.

PicoIP routing table {Local ID, Sequence Number; Local ID, Sequence Number$_{new}$}={3, SN$_{slave\ 3}$; 0, SN$_{slave\ x}$}.

IP routing table is {IP address, next hop, M}={destination address, 0, 0}; {dest. address, 0, 0}.

Each of the slaves in the piconet 14 discards the packet except for the slave 18-6 which forms the data destination node. The device 16/18-3 discards the packet as one of the two entries in its routing table 28 for the particular address indicates that the next hop is the sender of the packet. This overrules all other entries. And, the slave 18-6 replies on the packet with an empty packet, i.e., the PicoIP header without an appended body. This packet is returned first to the node 22. The packet header is identical to the packet header it received (including the IP destination address), except that the reply flag is now set.

The information recorded in the packet header 36 and the routing tables 26 and 28 of the slave 18-6 is as follows:

Packet header {Local ID, broadcast flag, next header; reply flag, Sequence Number}={0, 0, 0, 1, SN$_{master\ B}$}.

PicoIP routing table {Local ID, Sequence Number; Local ID, Sequence Number$_{new}$}={0, SN$_{master\ B}$; 0, 0}.

IP routing table no entry is created here.

The value of the reply flag 48 causes the receiving node, i.e., the node 22, to search the incoming ledger side 58 of the routing table 26. This produces an indication that the node 16/18-3 is to form the next hop in the reply back to the initiating node, node 18-1. Also, the node 18-6 is set as the next hop for the destination address recorded in the packet header. The information contained in the packet header and the tables 26–32 of the node 22 is as follows:

Packet header {Local ID, broadcast flag, next header; reply flag, Sequence Number}={3, 0, 0, 1, SN$_{slave\ 3}$}.

PicoIP routing table {Local ID, Sequence Number; Local ID, Sequence Number$_{new}$}={3, SN$_{slave\ 3}$; 0, SN$_{master\ B}$}.

IP routing table {IP address, next hop, M}={destination address, 0, 0}; {dest. address, 6, 0}.

The node 16/18-3 receives the packet, updates the fields thereof according to the PicoIP routing table 28 of the node 16/18-3 such that the following information is contained in the header and tables:

Packet header {Local ID, broadcast flag, next header; reply flag, Sequence Number}={1, 0, 0, 1, $SN_{slave\ 1}$}.

PicoIP routing table {Local ID, Sequence Number; Local ID, Sequence Number$_{new}$}={1, $SN_{slave\ 1}$; 3, $SN_{slave\ 3}$}.

IP routing table {IP address, next hop, M}={dest. address, 0, 1}.

The initiating node, node 18-1, looks up the sequence number with the local ID on the outgoing ledger 62 side of the routing table 26 thereof, and finds all zeros in the incoming ledger thereof. This indicates that the packet is destined for the node 18-1. All the entries that are entered in the routing tables are associated with a time out. When the time out expires, the entry is removed from the table. In this manner, a second entry in the routing table of the node 16/18-3, corresponding with the packet broadcast to the slaves of the piconet will time out as no response on this packet shall be received. Additionally, each PicoIP header for packets that are communicated between the two endpoints, the nodes 18-1 and 18-6 shall be the same as the headers used for the route setup, except for the next-header field. Thereby, the sequence number is associated with the connection for its entire lifetime. Every time in which a packet is sent or forwarded by one of the nodes in the communication path, the time out associated with the routing table entries is refreshed.

Figure 8:
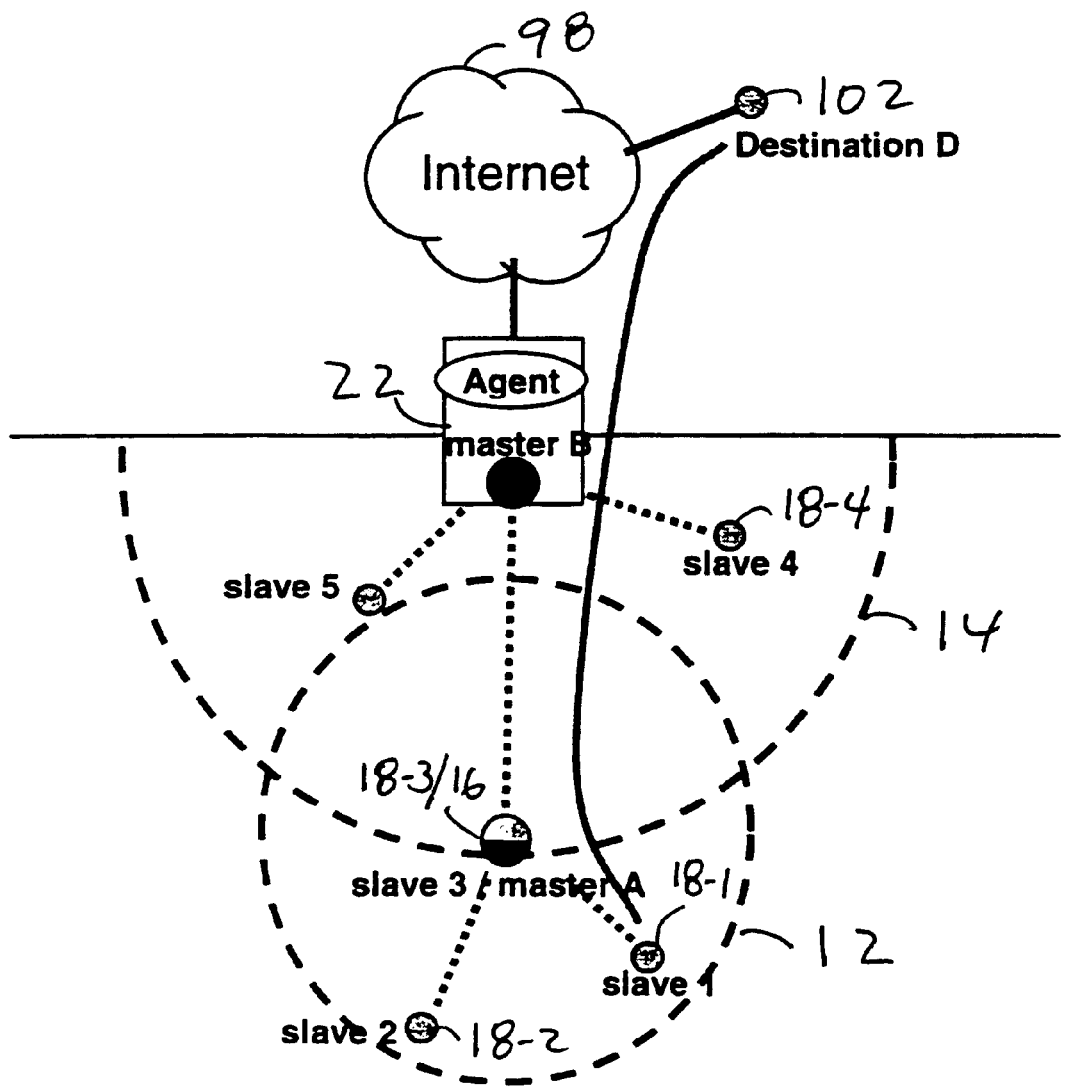
FIG. 8 illustrates a communication path formed in a Bluetooth scatternet, here further coupled to a fixed packet data network, and pursuant to which an embodiment of the present invention is operable.

Additional exemplary operation is illustrated with respect to FIG. 8. Again, a Bluetooth scatternet 10 is again shown, again formed of a first piconet 12 and a second piconet 14. The second piconet 14 is connected to a fixed packet data network, here the Internet 98. And, destination device 102 is connected to the Internet 98. The first piconet 12 is shown to be defined by a master and includes two slaves, slave 18-1 and slave 18-2. The second piconet 14 is defined by a master 22 and includes three slaves. One of the slaves is also the master which defines the first piconet, and is referenced by 18-3/16. The other two slaves are designated by 18-4 and 18-5. Here, for purposes of example, a communication session is initiated by the node 18-1, to be effectuated with the destination node 102. The information stored at the tables of the node 18-1 is as follows:

PicoIP routing table {Local ID, Sequence Number; Local ID, Sequence Number$_{new}$}{={0, 0; $SN_{slave\ 3}$}.

IP routing table is {IP address, next hop, M}={D, 0, 1}.

The packet from slave one to master A is composed as:

Packet header {Local ID, broadcast flag, next header; reply flag, Sequence Number}={1, 0, xx, 0, $SN_{slave\ 1}$(=$SN_{slave\ x}$)}.

The tables of the node 16/18-3 are as follows (the entry related to the broadcast in piconet 12 is left out, the broadcast packet will be discarded by the receiving nodes, and the entry shall eventually time out):

PicoIP routing table {Local ID Sequence Number; Local ID, Sequence Number$_{new}$}={1, $SN_{slave\ 1}$; 3, $SN_{slave\ x}$}.

IP routing table is {IP address, next hop, M}={D, 0, 1}.

The node 18-3/16 sends a packet to the node 22 as follows:

Packet header {Local ID, broadcast flag, next header; reply flag, Sequence Number}={3, 0, xx, 0, $SN_{slave\ 3}$}.

The node 16 then broadcasts a packet in the piconet 14 and the node also passes the PicoIP packet to an agent connected to an access point to the Internet 98. The access point is, in fact, built up from a Bluetooth module, or multiple modules, and the agent, and the access point has a connection with the Internet. The agent maintains a routing table which is shown in FIG. 9, and referenced by reference numeral 104. For each incoming packet, the table records the protocol at the column 106 thereof, the local ID of the last hop at the column 108, the sequence number, as assigned by the last hop, at the column 112, the source port number at the column 114, and a destination port number at the column 116. Such values are assigned by the originator of the packets to the related transport layer protocol header fields. The ports number fields in the columns 114 and 116 are relevant packet indications from the transport layer packet, TCP/UDP port numbers, ICMP sequence numbers, etc. The routing table 104 has the following entries:

Agent routing table {protocol, Local ID, Sequence Number; Source Port Number, Destination Port Number; Source Port Number$_{new}$, Destination Port Number$_{new}$}={4/6, 3, $SN_{slave\ 3}$; SourcePort$_{slave\ 3}$, DestPort$_{slave\ 3}$; SourcePort$_{new}$, DestPort$_{slave\ 3}$}. 4/6 refers to IPv4 or IPv6.

The agent replaces the PicoIP header 36 provided thereto with a conventional IP header, version 4 or 6, with a destination address being the same as that indicated in the PicoIP packet. The source address is a special IP address assigned to the access point, e.g., the IP address of the interface that is connected to the Internet 98. The agent then replaces the source port number in the transport layer packet with a number that uniquely identifies the connection with the mobile node. Every source port number at the right hand side of the table 104 is unique on that right side for the time period during which it is recorded in the table 104. The destination port number often can be copied from the incoming packet. Lastly, the agent routes the IP packets towards the destination 102 according to the routing tables.

When the packet is a PicoIP route setup packet, the agent determines whether the requested destination is available and present in the fixed Internet. If so, the agent replies with an empty packet, pursuant to normal route setup reply procedures, and adds the entry to the PicoIP routing table. If the determination indicates that the destination is unavailable or otherwise not present, the agent does not do anything as the destination can be present in the scatternet.

Packets returning from the destination are to be routed through the Internet backbone and processed again by the agent. The agent looks up to determine which entry the destination port number recorded in the packet matches, the source and destination swapped compared to the packet from the agent to the destination 102. This yields the next hop and sequence number in the communication path back to the node 18-1. The agent uses this information to compose the PicoIP header. Also, the original port numbers are restored in the corresponding transport protocol header fields. Then, it send the packet to the next hop. The next hop thereafter, the node 18-3/16 forwards on the packet to the node 18-1.

Communication paths formed in this manner by way of an access point to the Internet backbone is predicated upon, after initial link establishments, that the access point forms a master towards all nodes with which the access point communicates. During link setups, either the mobile node or the access point can start up and thus master the connection procedure, but when the link is established, the access point requests a master-to-slave switch if it is not the master. However, the principle of routing protocol is also met if the access point were, instead, a slave node. Operation of an embodiment of the present invention takes into account the mobility limited of Bluetooth devices which forms nodes. That is to say, many Bluetooth devices forming terminals shall be mobile, and movement of such nodes affects the routing tables of such nodes. In a node moves, the node either changes its location within the Bluetooth scatternet, or the node disappears, i.e., moves out of communication range with the scatternet. Such movement makes all routes the moving node had previously been involved with invalid. If this occurs during an exchange of packets between two nodes, both nodes shall lose the packets. Also, link quality can be a grade below a minimum threshold for a time, such as due to sudden temporary interference. To the other nodes this also appears to be temporary movement, or disappearance, of the a node. A third type of link change occurs when a node enters power-save mode, and therefore releases its local identifier AM_ADDR. All of this is implied by using wireless communication devices and must be accounted for in a routing protocol. The routing protocol of an embodiment of the present invention features two mechanisms for handling such nodal movements.

A first mechanism for handling node mobility is the device-to-member address mapping table 32 forming a portion of each node and as shown in FIG. 6. The table 32 is maintained by every node but differs depending upon whether the node is a master or a slave. The table indicates the validity of routes to a certain node, indicated by its local ID, or a member address, AM_ADDR, in the other tables. Master devices keep track of the member addresses that are currently assigned to the master device as slaves thereto. If a slave device disconnects or disappears, the AM_ADDR associated therewith is released. The value of AM_ADDR is without significance in the absence of keeping track of the actual nodes to which the address is assigned. Therefore, if an AM_ADDR is released, this can occur either explicitly when a node goes into a sleep mode or implicitly when a node does not return or acknowledge a number of packets of data. The corresponding entity is removed from the mapping table. Also, entries containing the value of the local ID, i.e., AM_ADDR, are removed from the PicoIP and the IP routing tables 26 and 28, respectively. And, if the access point is involved, the value is also removed from the agent routing table 104. All such entries identify a particular node, namely, the node to which the master assigns to the particular value of AM_ADDR. If a node enters a sleep mode, the master is able to keep track of the packet destined to it and it may activate the node again when packets are waiting for the node.

An originator of a packet to a certain destination determines whether a route has become invalid by use of time outs. Intermediate nodes should inform the packet originator of the route failure by returning a route error package. Such a route error packet is composed of a PicoIP packet header similarly to a packet returning from the destination, followed by an ICMP packet of type host unreachable, serving as route error packet. This route error packet is processed by every intermediate node which then erases the relevant entries from their respective routing tables. This is a second mechanism by which to handle mobility of the Bluetooth nodes. Nodes that disappear from the piconet shall trigger a repeated search by nodes that were communicating with such nodes at the time of route failure.

Thereby, a manner is provided by which to route packets of data between a data source node and a data destination node in a tooth scatternet. Routing tables are provided to each tooth device. A new packet header structure is provided, and values are extracted therefrom to be stored in the new routing tables. Such routing tables identify the manner by which to forward a packet of data provided thereto in a hop-by-hop manner to effectuate communication of a packet of data from a data source node to a data destination node.

The previous descriptions are of preferred examples for implementing the invention, and the scope of the invention should not necessarily be limited by this description. The scope of the present invention is defined by the following claims.

We claim:

1. In a multinode, ad hoc, wireless communication system having at least a data source node and a data destination node, and the communication system selectably and dynamically formed of a first piconet at which the data source node is positioned and a second piconet at which a data destination node is positioned, each of the first and at least second piconets having a master node and at least one slave node, the at least one slave node capable of communication of the packets of data only to an associated master node, the data source node forming a selected one of a slave node and a master node of the first piconet and the data destination node a selected one of a slave node and a master node of the second piconet, an improvement of apparatus for facilitating routing of packets of data between the data source node and the data destination node by way of a communication path, the communication path having at least one node, inclusive of the data destination node, said apparatus comprising:

at least one first routing table embodied at each of the at least one node of the communication path and having an incoming data ledger and an outgoing data ledger, said first routing table for facilitating mapping an incoming data packet to an outgoing data packet, said first routing table populated with values extracted from header information of the packets, the packets routed in a first manner using values of the at least one first routing table when the node at which said at least one first routing table is embodied forms a slave node and the packets routed in a second manner using values of the at least one first routing table when the node at which said at least one first routing table is embodied forms a master node.

2. The apparatus of claim 1 wherein the communication path includes a first node and at least a second node, and wherein a first routing table of said at least one first routing table is embodied at the first node and another first routing table of said at least one first routing table is embodied at the second node.

3. The apparatus of claim 2 wherein the first node comprises the data source node and the at least the second node comprises an intermediary node, positioned along the communication path between the data source node and the data destination node, wherein the incoming data ledger of the first routing table located at the data source node includes an indication of an identifier identifying the data source node, and an indication of an identifier identifying the packet of data to be communicated by the data source node.

4. The apparatus of claim 3 wherein the outgoing data ledger of the first routing table located at the data source node includes an indication of an identifier identifying the data source node and an indication of the identifier identifying the packet of data to be communicated by the data source node, incremented by an incrementation value.

5. The apparatus of claim 4 wherein the first routing table located at the intermediary node includes an incoming data ledger and an outgoing data ledger, the incoming data ledger thereof including an indication of an identifier identifying the data source node and an indication of an identifier identifying the packet of data communicated by the data source node to the intermediary node, and the outgoing data ledger thereof including an indication of an identifier identifying the intermediary node in the communication path and an indication of an identifier identifying the packet of data to be communicated by the intermediary node to a subsequent.

6. The apparatus of claim 5 wherein the subsequent node comprises the data destination node, the data destination node further having a first routing table, said first routing table further having an incoming data ledger and an outgoing data ledger, the incoming data ledger including an indication of an identifier identifying the intermediary node and an identifier identifying the packet data incremented by the incrementation value and the outgoing data ledger thereof including an indication of an identifier identifying the data destination node.

7. The apparatus of claim 1 further comprising a packet header generator coupled to receive data to be communicated by the data source node, said packet header generator for generating a packet header to be combined with a portion of the data to be communicated to by the data source node to form packet data, the packet header generated by said packet header generator including a local identification field indicating a local address by which the data source node is identified, a broadcast flag field identifying whether the packet data forms a broadcast packet, a next-header field indicating a next-header value, a sequence number field indicating a packet identifier, and a destination address field indicating an address of a node in the communication path.

8. The apparatus of claim 7 wherein information contained in the packet header is extracted to be stored at the incoming data ledger and the outgoing data ledger of said at least one routing table.

9. In a multinode, ad hoc, wireless communication system having at least a data source node and a data destination node, and the communication system selectably and dynamically formed of a first piconet at which the data source node is positioned and a second piconet at which a data destination node is positioned, each of the first and at least second piconets having a master node and at least one slave node, the at least one slave node capable of communication of the packets of data only to an associated master node, a selected one of a slave node and a master node of the first piconet, and the data destination node a selected one of a slave node and a master node of the second piconet, an improvement of apparatus for facilitating routing of packets of data between the data source node and the data destination node by way of a communication path, the communication path having at least one node, inclusive of the data destination node, said apparatus comprising:

at least one first routing table embodied at each of the at least one node of the communication path and having an incoming data ledger and an outgoing data ledger, said first routing table for facilitating mapping an incoming data packet to an outgoing data packet; and at least one second routing table embodied at each of the at least one node of the communication path, said second routing table for mapping an IP address to an address of a subsequent node in the communication path extending between the data source node and the data destination node, the packets routed in a first manner using values of the at least one first routing table and of the at least one second routing table when the node at which the first and second routing tables, respectively, are embodied forms a slave node and the packets routed in a second manner using values of the at least one second routing table when the node at which the first and second routing tables are embodied forms a master node.

10. The apparatus of claim 9 wherein the communication path includes a first node and at least a second node, and wherein said at least one second routing table comprises a second routing table of said at least one second routing table located at the first node and another a second routing table of said at least one second routing table located at the second node.

11. The apparatus of claim 9 wherein the multinode, ad hoc, communication system comprises a Bluetooth scatternet, wherein the data source node and the data destination node each comprise mobile Bluetooth terminals, the Bluetooth scatternet defining at least one node in the communication path to be a master node and at least one node in the communication path to be a slave node, said apparatus further comprising at least one third mapping table, said third mapping table having a local identifier ledger and a globally-unique identifier ledger, said third mapping table for mapping a currently-allocated local identifier to a globally-unique identifier.

12. A method for facilitating routing of packets of data upon a multinodal communication path including at least a data source node and a data destination node in an ad hoc, wireless communication system, and the communication system selectably and dynamically formed of a first piconet at which the data source node is positioned and a second piconet at which the data destination is positioned each of the first and at least second piconets having a master node and at least one slave node, the at least one slave node capable of communication of the packets of data only to an associated master node, the data source node forming a selected one of a slave node and a master node of the first piconet and the data destination node a selected one of a slave node and a master node of the second piconet, said method comprising:

forming at least a first routing table at each node of the communication path, the first routing table having an incoming data ledger and an outgoing data ledger;

routing the packet data upon the communication path, the packets routed in a first manner using values of the at least the first routing table when the node at which the at least one first routing table is embodied forms a slave node and the packets routed in a second manner using values of the at least one first routing table when the node at which the at least one first routing table is embodied forms a master node; and as the packet data is routed to each node of the communication path, extracting first selected information from the packet data and inserting the information into the incoming data ledger and of the first routing table, selectably amending the packet data, and inserting second selected information into the outgoing data ledger of the first routing table.

13. The method of claim 12 wherein the first selected information inserted into the incoming data ledger at each node includes an indication of an identifier of a prior node through which the packet data is routed and an indication of an identifier identifying the packet data to be communicated through the communication path.

14. The method of claim 13 wherein the second selected information inserted into the outgoing ledger at each node includes an identifier identifying the node at which each respective first routing table is located.

15. The method of claim 12 further comprising the additional operation of forming a second routing table at each node of the communication path, each second routing table for mapping an IP address to an address of a subsequent node in the communication path.

16. The method of claim 15 wherein the ad hoc, wireless communication system comprises a Bluetooth scatternet, wherein the data source node and the data destination node each comprise Bluetooth terminals, said method comprising the further operation of forming a third mapping table at each node, the third mapping table having a local identifier ledger and a identifier ledger, each third mapping table for mapping a currently-allocated local identifier to an identifier.

17. The method of claim 16 further comprising the operation of generating a packet header for each data packet of the packet data.

* * * * *